US012252121B2

United States Patent
Yang et al.

(10) Patent No.: US 12,252,121 B2
(45) Date of Patent: Mar. 18, 2025

(54) SYSTEMS AND METHODS FOR EMPLOYING DRIVER INPUT FOR ADAPTING PATH PLANNING IN LANE CENTERING APPLICATIONS

(71) Applicant: GM GLOBAL TECHNOLOGY OPERATIONS LLC, Detroit, MI (US)

(72) Inventors: Xuefei Yang, Northville, MI (US); Paul A Adam, Milford, MI (US); Tetyana V Mamchuk, Walled Lake, MI (US); Brian Porto, Wixom, MI (US); Ashraf Abualfellat, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 18/179,713

(22) Filed: Mar. 7, 2023

(65) Prior Publication Data

US 2024/0300490 A1    Sep. 12, 2024

(51) Int. Cl.
| | |
|---|---|
| *B60W 30/12* | (2020.01) |
| *B60W 30/18* | (2012.01) |
| *B60W 40/06* | (2012.01) |
| *B60W 50/10* | (2012.01) |

(52) U.S. Cl.
CPC ...... *B60W 30/12* (2013.01); *B60W 30/18163* (2013.01); *B60W 40/06* (2013.01); *B60W 50/10* (2013.01); *B60W 2510/202* (2013.01)

(58) Field of Classification Search
CPC .......... B60W 30/12; B60W 30/18163; B60W 40/06; B60W 50/10; B60W 2510/202
USPC ...................................................... 701/41–44
See application file for complete search history.

(56) References Cited

U.S. PATENT DOCUMENTS

2024/0286608 A1*  8/2024  Schwegler ........ B60W 50/0097

* cited by examiner

*Primary Examiner* — Hai H Huynh
(74) *Attorney, Agent, or Firm* — Lorenz & Kopf LLP

(57) ABSTRACT

Methods and systems are provided for controlling a vehicle. In one embodiment, a method includes: determining, by a processor, that a lane centering feature is active in the vehicle; identifying, by the processor, a pattern of steering wheel torque; determining, by the processor, a driver requested offset based on a location of the vehicle and a location of a center of the lane; applying, by the processor, the driver requested offset to a planned trajectory of the vehicle; evaluating, by the processor, one or more duration conditions; and in response to the evaluating, selectively generating, by the processor, a control signal based on the planned trajectory with the driver requested offset.

20 Claims, 5 Drawing Sheets

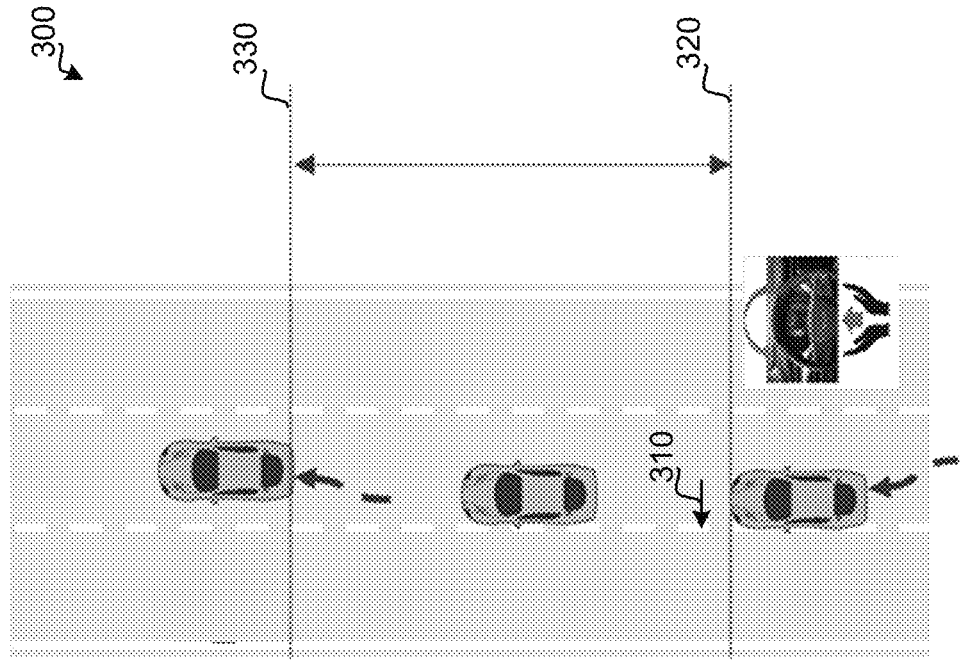

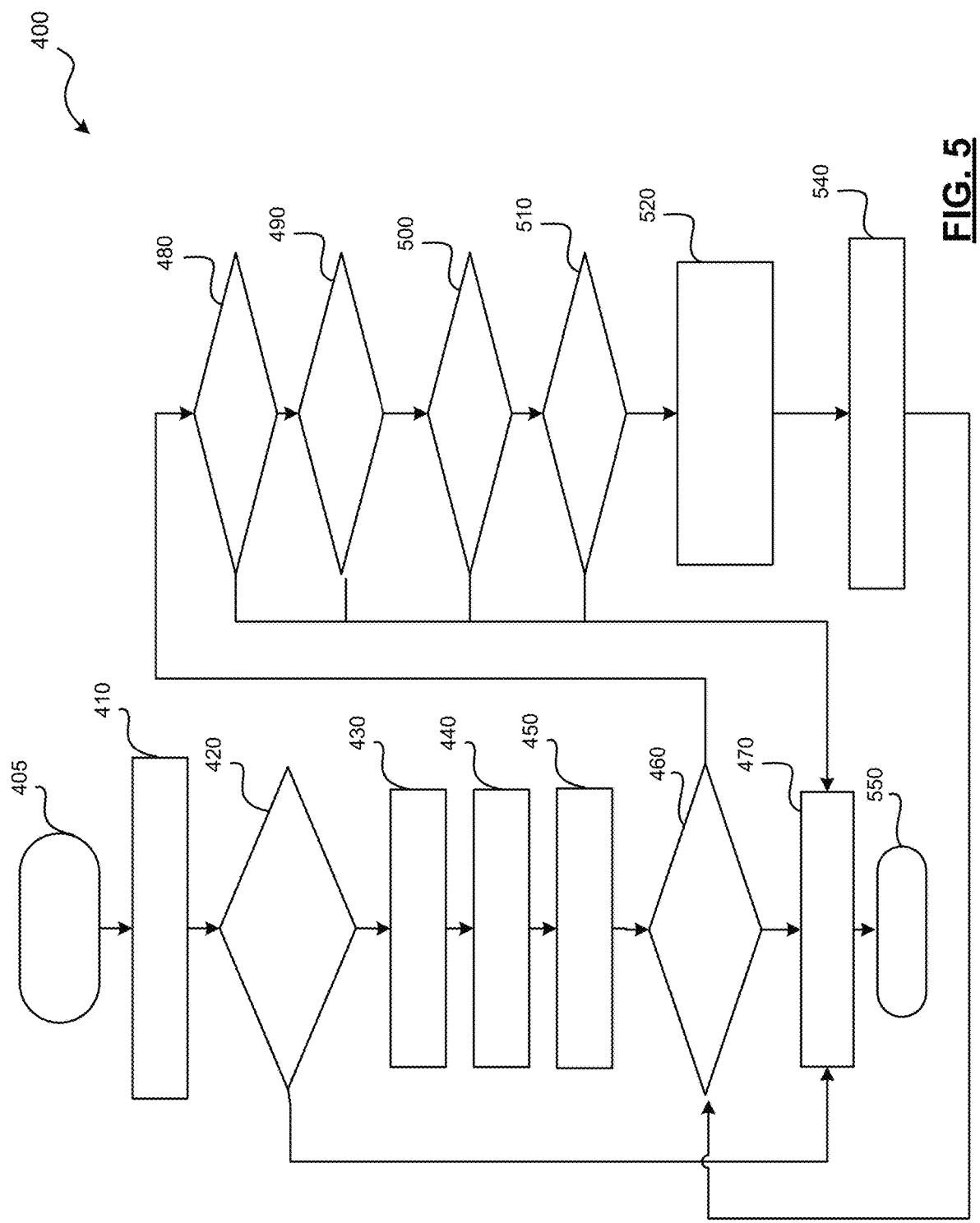

SYSTEMS AND METHODS FOR EMPLOYING DRIVER INPUT FOR ADAPTING PATH PLANNING IN LANE CENTERING APPLICATIONS

INTRODUCTION

The technical field generally relates to autonomous control systems, and more particularly relates to path planning for lane centering in autonomous driving.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Many autonomous driving features require a driver to be present and to remain engaged and take back control when necessary. In some instances, it may be desirable for a driver to provide input to the current autonomous control without the driving having to take back complete control. For example, lane centering features typically maintain the path of the vehicle along a virtual center line of the current lane. In some instances, a driver may wish to offset the path from the center of a lane when an obstacle is identified in an adjacent lane. It would be desirable for the driver to provide input in such circumstances without having to take back full control.

Accordingly, it is desirable to provide improved path planning strategies, methods, and systems for lane centering when a driver provides inputs. Furthermore, other desirable features and characteristics of the present disclosure will become apparent from the subsequent detailed description and the appended claims, taken in conjunction with the accompanying drawings and the foregoing technical field and background.

SUMMARY

Methods and systems are provided for controlling a vehicle. In one embodiment, a method includes: determining, by a processor, that a lane centering feature is active in the vehicle; identifying, by the processor, a pattern of steering wheel torque; determining, by the processor, a driver requested offset based on a location of the vehicle and a location of a center of a lane; applying, by the processor, the driver requested offset to a planned trajectory of the vehicle; evaluating, by the processor, one or more duration conditions; and in response to the evaluating, selectively generating, by the processor, a control signal based on the planned trajectory with the driver requested offset.

In various embodiments, the pattern includes a steering wheel torque range and a period of time.

In various embodiments, the one or more duration conditions includes at least one of a time and a distance condition, and wherein the evaluating includes evaluating at least one of a time and a distance since the identification of the pattern with the at least one of timer threshold and distance threshold.

In various embodiments, the selectively generating includes generating the control signal based on the planned trajectory with the driver requested offset when the at least one of time and distance is less than the at least one of timer threshold and distance threshold, and generating the control signal based on the planned trajectory with a baseline offset when the at least one of time and distance is greater than or equal to the at least one of timer threshold and distance threshold.

In various embodiments, the method includes selecting that at least one of the timer threshold and the distance threshold based on a road condition.

In various embodiments, the one or more duration conditions includes a driver intent condition, and wherein the evaluating includes evaluating whether there is a driver intent to recenter the vehicle.

In various embodiments, the selectively generating includes generating the control signal based on the planned trajectory with the driver requested offset when there is not a driver intent to recenter the vehicle, and generating the control signal based on the planned trajectory with a baseline offset when there is a driver intent to recenter the vehicle.

In various embodiments, the one or more duration conditions includes a lane center feature disablement condition, and wherein the evaluating includes evaluating whether the lane centering feature is disabled.

In various embodiments, the selectively generating includes generating the control signal based on the planned trajectory with the driver requested offset when the lane centering feature is not disabled, and generating the control signal based on the planned trajectory with a baseline offset when the lane centering feature is disabled.

In various embodiments, the one or more duration conditions includes a lane change condition, and wherein the evaluating includes evaluating whether a lane change is initiated.

In various embodiments, the selectively generating includes generating the control signal based on the planned trajectory with the driver requested offset when the lane change is not initiated, and generating the control signal based on the planned trajectory with a baseline offset when the lane change is initiated.

In various embodiments, the one or more duration conditions includes an environmental condition, and wherein the evaluating includes evaluating whether the environmental condition that caused the driver intent still exists.

In various embodiments, the selectively generating includes generating the control signal based on the planned trajectory with the driver requested offset when the environmental condition that caused the driver intent still exists, and generating the control signal based on the planned trajectory with a baseline offset when the environmental condition that caused the driver intent no longer exists.

In another embodiment, a system for controlling a vehicle, comprising: a non-transitory computer readable medium comprising instructions configured to perform a process, by a processor, the process comprising: determining that a lane centering feature is active in the vehicle; identifying a pattern of steering wheel torque; determining a driver requested offset based on a location of the vehicle and a location of a center of a lane; applying the driver requested offset to a planned trajectory of the vehicle; evaluating one or more duration conditions; and in response to the evaluating, selectively generating a control signal based on the planned trajectory with the driver requested offset.

In various embodiments, the pattern includes a steering wheel torque range and a period of time.

In various embodiments, the one or more duration conditions includes at least one of a time and a distance condition, wherein the evaluating includes evaluating at least one of a time and a distance since the identification of the pattern with at least one of a timer threshold and a distance threshold, and wherein the selectively generating includes: generating the control signal based on the planned trajectory with the driver requested offset when the at least one of time and distance is less than the at least one of timer threshold and distance threshold, and generating the control signal based on the planned trajectory with a baseline offset when the at least one of time and distance is greater than or equal to the at least one of timer threshold and distance threshold.

In various embodiments, the processes includes selecting that at least one of the timer threshold and the distance threshold based on a road condition.

In various embodiments, the one or more duration conditions includes a driver intent condition, wherein the evaluating includes evaluating whether there is a driver intent to recenter the vehicle, and wherein the selectively generating includes: generating the control signal based on the planned trajectory with the driver requested offset when there is not a driver intent to recenter the vehicle, and generating the control signal based on the planned trajectory with a baseline offset when there is the driver intent to recenter the vehicle.

In various embodiments, the one or more duration conditions includes a lane change condition, wherein the evaluating includes evaluating whether a lane change is initiated, and wherein the selectively generating includes generating the control signal based on the planned trajectory with the driver requested offset when the lane change is not initiated, and generating the control signal based on the planned trajectory with a baseline offset when the lane change is initiated.

In various embodiments, the one or more duration conditions includes an environmental condition, and wherein the evaluating includes evaluating whether the environmental condition that caused the driver intent still exists, and wherein the selectively generating includes: generating the control signal based on the planned trajectory with the driver requested offset when the environmental condition that caused the driver intent still exists, and generating the control signal based on the planned trajectory with a baseline offset when the environmental condition that caused the driver intent no longer exists.

BRIEF DESCRIPTION OF THE DRAWINGS

The exemplary embodiments will hereinafter be described in conjunction with the following drawing figures, wherein like numerals denote like elements, and wherein:

FIG. 4 is an illustration of path planning as performed by the path planning system in accordance with various embodiments; and FIG. 5 is process flow chart depicting example processes for path planning in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
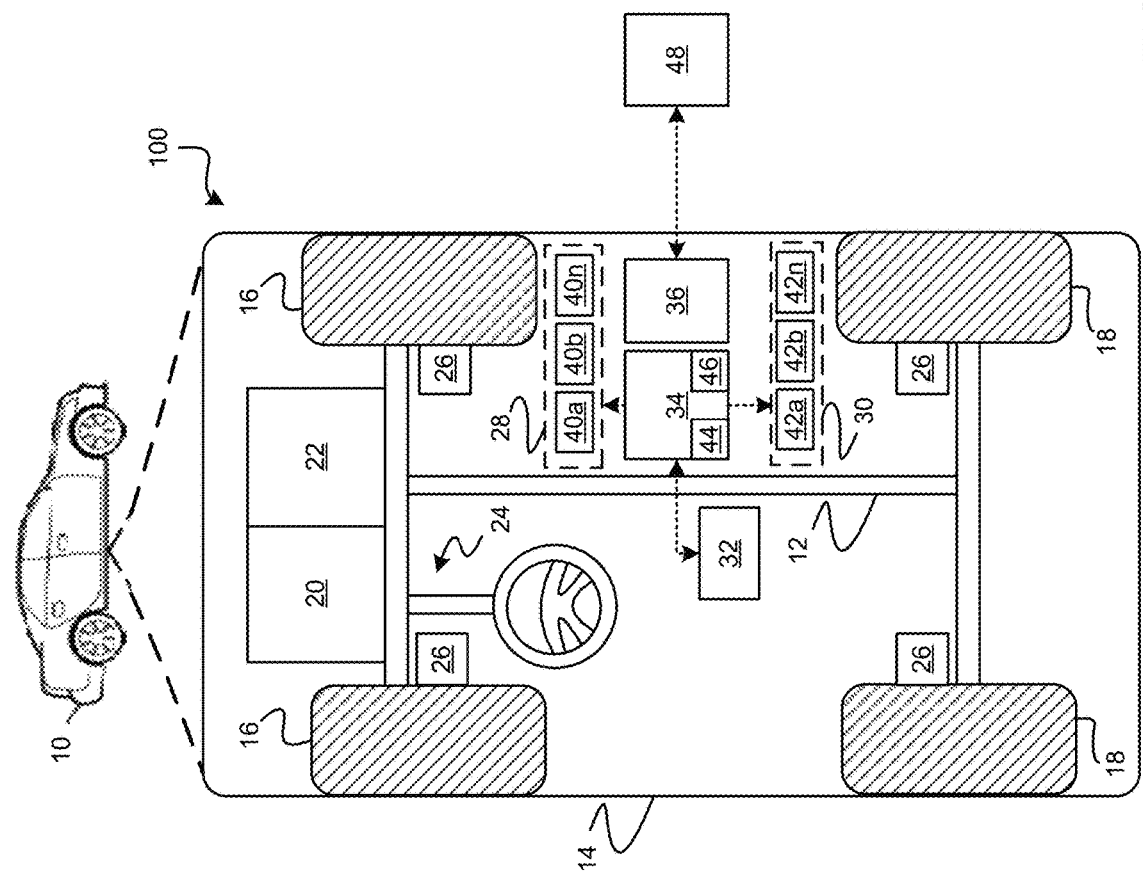
FIG. 1 is a block diagram illustrating an autonomous vehicle having a path planning system in accordance with various embodiments.

With reference to FIG. 1, a path planning system shown generally at 100 is associated with a vehicle 10 in accordance with various embodiments. In general, the path planning system 100 detects a driver's desire to offset a relative to path trajectory as calculated by an automated system and applies the desired offset based on an assessment of the current operating and environmental conditions. As will be discussed in more detail, the path planning system 100 allows for continued automated control while accepting driver input by providing non-intrusive handoff between control system and the driver; the path planning system 100 allows for the ability to determine an amount of driver requested offset relative to the position selected by an automated lane centering system; and the path planning system 100 allows for the ability to interpret driver intentions and provide variable duration of applied offset before resuming normal operation.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the path planning system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is configured to perform autonomous features such as, but not limited to, hands on lane centering assist, path-based lane keep assist, super cruise, ultra-cruise, etc.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18.

The sensor system 28 includes one or more sensing devices 40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, and/or other sensors. The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
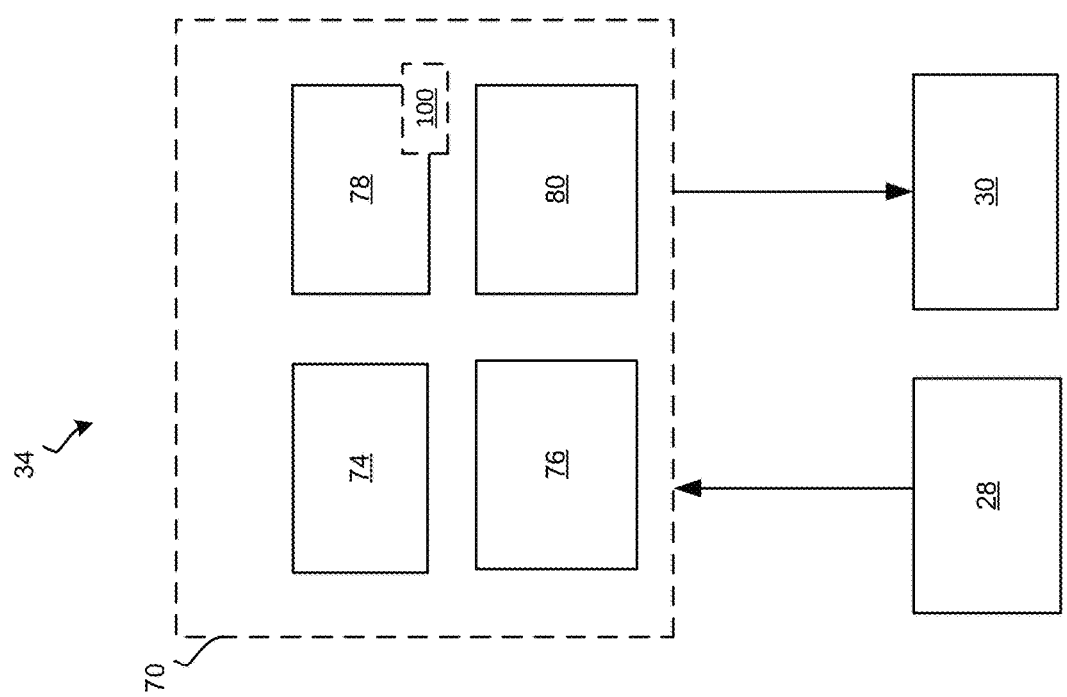
FIG. 2 is a functional block diagram illustrating features of an autonomous driving system of the autonomous vehicle in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, as discussed in detail below, one or more instructions of the controller 34 are embodied in the path planning system 100 and, when executed by the processor 44, process sensor data and/or other data, to detect a driver initiated offset request, for example by a driver manipulating steering the steering system while the vehicle 10 is moving within a lane, to compute a driver requested offset relative to a current path trajectory, to compute an offset duration based on current operating and/or environmental conditions, and to control the vehicle 10 based on the computed offset and duration.

Referring now to FIG. 2, and with continued reference to FIG. 1, a dataflow diagram illustrates various embodiments of an autonomous driving system (ADS) 70 which may be embedded within the controller 34 and which may include parts of the path planning system 100 in accordance with various embodiments. That is, suitable software and/or hardware components of controller 34 (e.g., processor 44 and computer-readable storage device 46) are utilized to provide an autonomous driving system 70 that is used in conjunction with vehicle 10.

Inputs to the autonomous driving system 70 may be received from the sensor system 28, received from other control modules (not shown) associated with the autonomous vehicle 10, received from the communication system 36, and/or determined/modeled by other sub-modules (not shown) within the controller 34. In various embodiments, the instructions of the autonomous driving system 70 may be organized by function or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to, cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as obstruction mitigation, route traversal, mapping, sensor integration, ground-truth determination, and feature detection, and object classification as discussed herein.

As mentioned briefly above, the path planning system 100 of FIG. 1 is included within the autonomous driving system 70. For example, all or parts of the path planning system 100 may be included within the guidance system 78 and/or the vehicle control system 80. For example, as shown in more detail with regard to FIG. 3 and with continued reference to FIGS. 1 and 2, the path planning system 100 includes a driver intention detection module 102, an offset determination module 104, a duration determination module 106, and a path control module 108.

In various embodiments, the driver intention detection module 102 receives as input steering wheel torque data 110. The driver intention detection module 102 monitors the steering wheel torque data 110 to determine whether a pattern of torque has been applied by the driver to the steering wheel in order to initiate an offset of travel from the lane center. For example, when the steering wheel torque values fall within a range (e.g., between 0.4 NM and 2.4 Nm, or some other low range), for a period of time (e.g., 300 ms), indicating a "gentle" torque has been applied, the driver intention detection module 102 generates driver intent data 112 indicating the driver's intention for an offset. In another example, when the steering wheel torque falls outside of the range or is not within the range for the period of time, the driver intention detection module 102 generates driver intent data 112 indicating the does not intend an offset.

In various embodiments, the offset determination module 104 receives as input the driver intent data 112, vehicle location data 114, and lane center data 116. The offset determination module 104 computes an offset value based on the vehicle location with respect to the lane center and generates driver requested offset data 118 based thereon. For example, as shown in the example scenario 300 of FIG. 4, the offset determination module 104 computes the difference between the lane center and the location of the vehicle center to obtain the offset distance 310.

With reference back to FIG. 3, in various embodiments, the duration determination module 106 receives as input the driver intent data 112, the steering wheel torque data 110, lane center feature data 120, lane change data 122, environment data 124, and road data 126. When the driver intent data 112 indicates that an offset is intended, the duration determination module 106 evaluates the inputs 120-126 in order to determine a duration to apply the determined driver requested offset and generates duration data 128 based thereon. For example, as shown in the example scenario 300 of FIG. 4, the duration may include a window defined by a start 320 that occurs once the pattern of torque has been identified and an end 330 that occurs once one or more duration conditions have been satisfied. The duration determination module 106 determines the start 320 and the end 330 and sets the duration data 128 to indicate whether the offset should be active or inactive. Thus, the duration window is dynamically determined based on one or more conditions associated with the vehicle 10. In various embodiments, the duration conditions can include, but are not limited to, a time or distance condition, a driver intent condition, a lane change condition, a lane center feature disablement condition, and an environment condition.

For example, the duration determination module 106 determines the start 320 as the time/location when the driver initiated the intent. The duration determination module 106 then sets the duration data 128 to be active for a time or distance traveled since the driver initiating the intent. In various embodiments, the duration determination module 106 compares the time or distance traveled to a threshold value and sets the duration data 128 back to inactive once the threshold has been reached or exceeded. In various embodiments, the threshold value is selectable based on the current road conditions (e.g., straight road, curved road, length of curve, etc.). For example, the threshold time or distance may be set to equal the entire distance or just passed the distance of the curvature.

In another example, the duration determination module 106 determines that the offset should be inactive and sets the duration data 128 when the steering wheel torque data 110 indicates that the driver intends for the offset to be removed (e.g., by counter steering back to the center of the lane). In another example, the duration determination module 106 determines that the offset should be inactive and sets the duration data 128 when the lane center feature data 120 indicates that the driver has disabled the lane center feature (e.g., by switching the feature off actively or passively). In another example, the duration determination module 106 determines that the offset should be inactive and sets the duration data 128 when the lane change data 122 indicates that a lane change was initiated (e.g., blinker is active and vehicle lateral motion is detected). In another example, the duration determination module 106 determines that the offset should be inactive and sets the duration data 128 when the environment data 124 indicates that that an element in the environment causing the offset (e.g., construction cones, large truck, double parked cars, etc.) is no longer present.

As can be appreciated, the inputs 120-126 can be used to evaluate the duration conditions and to selectively set the end 330 in various ways and in various orders as the embodiments are not limited to the examples provided herein.

With reference back to FIG. 3, in various embodiments, the path control module 108 receives as input the driver requested offset data 118, the duration data 128, and trajectory data 130 indicating a planned trajectory of the vehicle 10. The path control module 108 selectively applies the driver requested offset data 118 to the trajectory data 130 based on the duration data 128 and generates trajectory control data 132 based thereon. For example, when the duration data 128 indicates that the offset is active, the path control module 108 determines the trajectory by adding/subtracting the driver requested offset to the positions of the trajectory. In another example, when the duration data 128 indicates that the offset is no longer active, the path control module 108 determines the trajectory by applying a baseline offset (e.g., a zero value or near zero value) to the positions of the trajectory.

Figure 3:
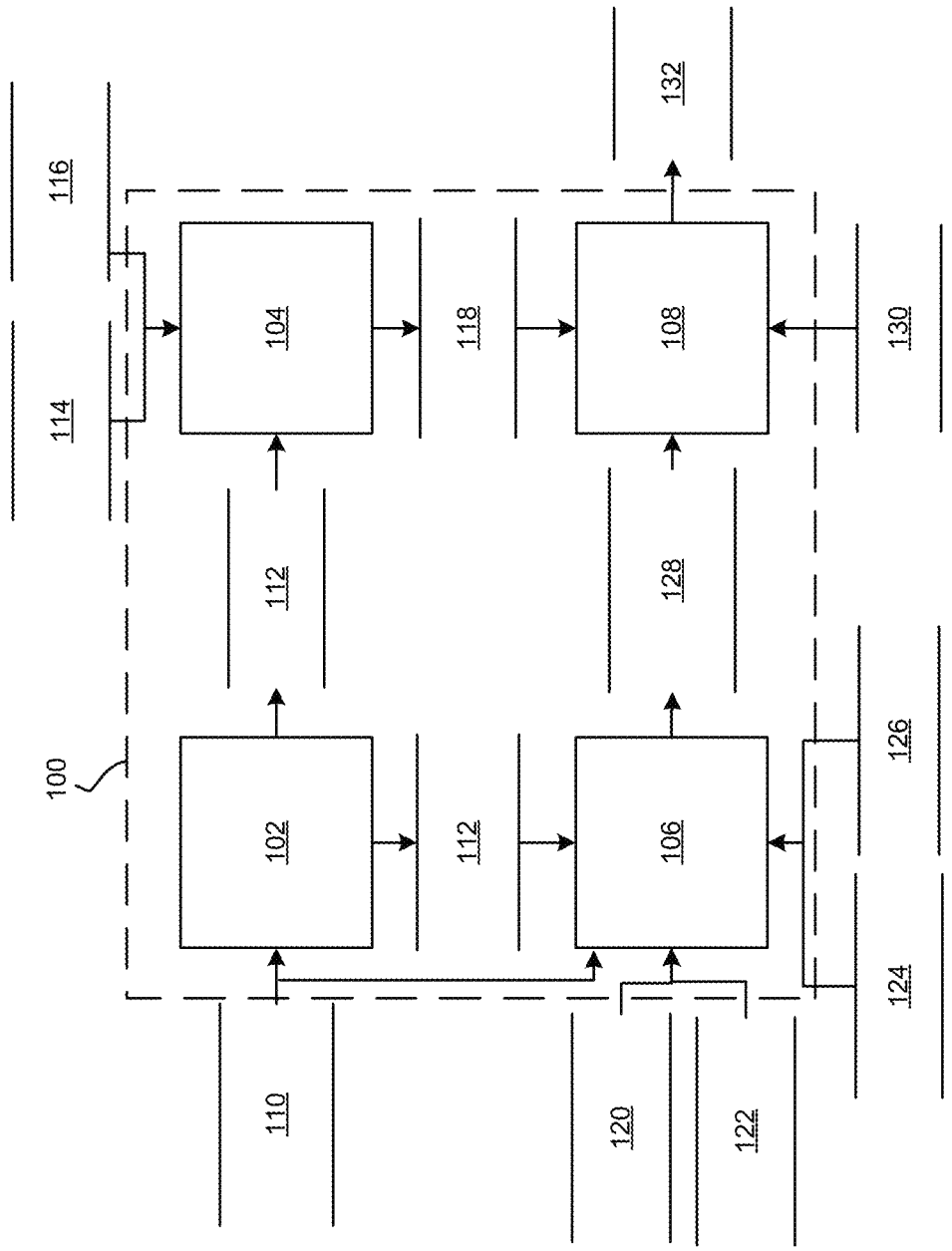
FIG. 3 is a dataflow diagram illustrating features of the path planning system of the autonomous driving system in accordance with various embodiments.

Referring now to FIG. 5, and with continued reference to FIGS. 1-4, a flowchart illustrates a process 400 that can be performed by the path planning system 100 of FIGS. 1-3 in accordance with the present disclosure. As can be appreciated in light of the disclosure, the order of operation within the process 400 is not limited to the sequential execution as illustrated in FIG. 5, but may be performed in one or more varying orders as applicable and in accordance with the present disclosure. In various embodiments, the process 400 can be scheduled to run based on one or more predetermined events, and/or can run continuously during operation of the autonomous vehicle 10, and/or may be run offline prior to operation of the vehicle 10.

In one embodiment, the process 400 may begin at 405 where it is determined that a lane centering feature is active. Thereafter, steering wheel torque is monitored at 410. It is determined whether a pattern of driver initiated steering wheel torque (e.g., a torque within a range for a predetermined time) is identified at 420, if the pattern of driver initiated steering wheel torque is not identified, the process 400 may end at 550.

If, however, the pattern of driver initiated steering wheel torque is identified at 420, a driver requested offset is computed at 430. The driver requested offset is then applied to the trajectory of the current path at 440; and a duration timer/distance is initialized at 450.

Thereafter, duration conditions, such as, but not limited to, a timer/distance condition, a driver intent condition, a lane centering feature disabled condition, a lane change condition, and an environmental condition are evaluated at 460 and 480-520. For example, at 460, a timer/distance threshold is determined based on the current road conditions, such as the amount and distance of a road curvature, and compared to the current timer/distance. If the current timer/distance is equal to or greater than the timer/distance threshold at 460, the offset duration is ended. The trajectory is determined based on a baseline offset at 470; and control signals are generated based on the trajectory at 540. Thereafter, the process 400 may end at 550.

In another example, if the current timer/distance is not equal to or greater than the timer/distance threshold at 460, the driver intent is monitored at 480. If the driver intent indicates a desire to re-center the vehicle 10 (e.g., the steering wheel torque exceeds a threshold, and/or other conditions indicate intent to re-center has occurred), the offset duration is ended. The trajectory is determined based on a baseline offset at 470; and control signals are generated based on the trajectory at 540. Thereafter, the process 400 may end at 550.

In another example, if the driver intent does not indicate a desire to re-center at 480, the conditions for disabling the current lane centering feature are monitored at 490. When it is determined that the lane centering feature is disabled at 490, the offset duration is over. The trajectory is determined based on a baseline offset at 470; and control signals are generated based on the trajectory at 540. Thereafter, the process 400 may end at 550.

In another example, when it is determined that the lane centering is not disabled at 490, lane change conditions are monitored at 500. When it is determined that a lane change has occurred at 500, the offset duration is ended. The trajectory is determined based on a baseline offset at 470; and control signals are generated based on the trajectory at 540. Thereafter, the process 400 may end at 550.

In still another example, when it is determined that a lane change has not occurred at 500, environmental conditions are monitored for conditions causing the offset at 510. When the environmental condition no longer exists, the offset duration is over. The trajectory is determined based on a baseline offset at 470; and control signals are generated based on the trajectory at 540. Thereafter, the process 400 may end at 550.

If, however, the environmental condition remains the same, no conditions exist to cancel the offset, the trajectory is determined based on the driver requested offset at 520; and control signals are generated based on the trajectory at 540. Thereafter, the process 400 continues with monitoring the offset duration conditions at 460. The process 400 continues until the driver requested offset is ended.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising:
    determining, by a processor, that a lane centering feature is active in the vehicle;

identifying, by the processor, a pattern of steering wheel torque;
determining, by the processor, a driver requested offset based on a location of the vehicle and a location of a center of a lane;
applying, by the processor, the driver requested offset to a planned trajectory of the vehicle;
evaluating, by the processor, one or more duration conditions; and
in response to the evaluating, selectively generating, by the processor, a control signal based on the planned trajectory with the driver requested offset.

2. The method of claim 1, wherein the pattern includes a steering wheel torque range and a period of time.

3. The method of claim 1, wherein the one or more duration conditions includes at least one of a time and a distance condition, and wherein the evaluating comprises evaluating at least one of a time and a distance since the identification of the pattern is with respect to at least one of timer threshold and a distance threshold.

4. The method of claim 3, wherein the selectively generating comprises generating the control signal based on the planned trajectory with the driver requested offset when the at least one of the time and the distance is less than the at least one of the timer threshold and the distance threshold, and generating the control signal based on the planned trajectory with a baseline offset when the at least one of the time and the distance is greater than or equal to the at least one of the timer threshold and the distance threshold.

5. The method of claim 3, further comprising selecting at least one of the timer threshold and the distance threshold based on a road condition.

6. The method of claim 1, wherein the one or more duration conditions includes a driver intent condition, and wherein the evaluating comprises evaluating whether there is a driver intent to recenter the vehicle.

7. The method of claim 6, wherein the selectively generating comprises generating the control signal based on the planned trajectory with the driver requested offset when there is not the driver intent to recenter the vehicle, and generating the control signal based on the planned trajectory with a baseline offset when there is the driver intent to recenter the vehicle.

8. The method of claim 1, wherein the one or more duration conditions includes a lane center feature disablement condition, and wherein the evaluating comprises evaluating whether the lane centering feature is disabled.

9. The method of claim 8, wherein the selectively generating comprises generating the control signal based on the planned trajectory with the driver requested offset when the lane centering feature is not disabled, and generating the control signal based on the planned trajectory with a baseline offset when the lane centering feature is disabled.

10. The method of claim 1, wherein the one or more duration conditions includes a lane change condition, and wherein the evaluating comprises evaluating whether a lane change is initiated.

11. The method of claim 10, wherein the selectively generating comprises generating the control signal based on the planned trajectory with the driver requested offset when the lane change is not initiated, and generating the control signal based on the planned trajectory with a baseline offset when the lane change is initiated.

12. The method of claim 1, wherein the one or more duration conditions includes an environmental condition, and wherein the evaluating comprises evaluating whether the environmental condition that caused a driver intent still exists.

13. The method of claim 12, wherein the selectively generating comprises generating the control signal based on the planned trajectory with the driver requested offset when the environmental condition that caused the driver intent still exists, and generating the control signal based on the planned trajectory with a baseline offset when the environmental condition that caused the driver intent no longer exists.

14. A system for controlling a vehicle, comprising:
a non-transitory computer readable medium comprising instructions configured to perform a process, by a processor, the process comprising:
determining that a lane centering feature is active in the vehicle;
identifying a pattern of steering wheel torque;
determining a driver requested offset based on a location of the vehicle and a location of a center of a lane;
applying the driver requested offset to a planned trajectory of the vehicle;
evaluating one or more duration conditions; and
in response to the evaluating, selectively generating a control signal based on the planned trajectory with the driver requested offset.

15. The system of claim 14, wherein the pattern includes a steering wheel torque range and a period of time.

16. The system of claim 14, wherein the one or more duration conditions includes at least one of a time and a distance condition, wherein the evaluating comprises evaluating at least one of a time and a distance since the identification of the pattern is with respect to at least one of a timer threshold and a distance threshold, and wherein the selectively generating comprises: generating the control signal based on the planned trajectory with the driver requested offset when the at least one of the time and the distance is less than the at least one of the timer threshold and the distance threshold, and generating the control signal based on the planned trajectory with a baseline offset when the at least one of the time and the distance is greater than or equal to the at least one of the timer threshold and the distance threshold.

17. The system of claim 16, further comprising selecting that at least one of the timer threshold and the distance threshold based on a road condition.

18. The system of claim 14, wherein the one or more duration conditions includes a driver intent condition, wherein the evaluating comprises evaluating whether there is a driver intent to recenter the vehicle, and wherein the selectively generating comprises: generating the control signal based on the planned trajectory with the driver requested offset when there is not the driver intent to recenter the vehicle, and generating the control signal based on the planned trajectory with a baseline offset when there is the driver intent to recenter the vehicle.

19. The system of claim 14, wherein the one or more duration conditions includes a lane change condition, wherein the evaluating comprises evaluating whether a lane change is initiated, and wherein the selectively generating comprises generating the control signal based on the planned trajectory with the driver requested offset when the lane change is not initiated, and generating the control signal based on the planned trajectory with a baseline offset when the lane change is initiated.

20. The system of claim 14, wherein the one or more duration conditions includes an environmental condition, and wherein the evaluating comprises evaluating whether the environmental condition that caused a driver intent still exists, and wherein the selectively generating comprises: generating the control signal based on the planned trajectory with the driver requested offset when the environmental condition that caused the driver intent still exists, and generating the control signal based on the planned trajectory with a baseline offset when the environmental condition that caused the driver intent no longer exists.

* * * * *